US010725893B2

(12) United States Patent
Fazunenko et al.

(10) Patent No.: US 10,725,893 B2
(45) Date of Patent: Jul. 28, 2020

(54) SYSTEM AND METHOD FOR DETERMINATION OF CODE COVERAGE FOR SOFTWARE APPLICATIONS IN A NETWORK ENVIRONMENT

(71) Applicant: ORACLE INTERNATIONAL CORPORATION, Redwood Shores, CA (US)

(72) Inventors: Dmitry Fazunenko, St. Petersburg (RU); Alexey Fedorchenko, St. Petersburg (RU)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/418,812

(22) PCT Filed: Mar. 28, 2014

(86) PCT No.: PCT/RU2014/000225
§ 371 (c)(1),
(2) Date: Jan. 30, 2015

(87) PCT Pub. No.: WO2015/147690
PCT Pub. Date: Oct. 1, 2015

(65) Prior Publication Data
US 2016/0259712 A1    Sep. 8, 2016

(51) Int. Cl.
*G06F 11/36* (2006.01)
*G06F 11/34* (2006.01)

(52) U.S. Cl.
CPC ...... *G06F 11/3676* (2013.01); *G06F 11/3409* (2013.01); *G06F 2201/865* (2013.01); *G06F 2201/875* (2013.01)

(58) Field of Classification Search
CPC .................................................. G06F 11/3676
See application file for complete search history.

(56) References Cited

U.S. PATENT DOCUMENTS 7,206,732 B2 * 4/2007 Williams ............ G06F 17/5022
                                                                703/13
8,863,093 B1 * 10/2014 Chou .................. G06F 9/44521
                                                                717/124

(Continued)

OTHER PUBLICATIONS

International Searching Authority At the European Patent Office, International Search Report and Written Opinion for PCT International Patent Application No. PCT/RU2014/000225, dated Jan. 19, 2015, 9 pages.

(Continued)

*Primary Examiner* — Lewis A Bullock, Jr.
*Assistant Examiner* — Mohammad H Kabir
(74) *Attorney, Agent, or Firm* — Tucker Ellis LLP

(57) ABSTRACT

A system and method for determination of code coverage for software applications in a network environment. In accordance with an embodiment, a software application can be instrumented by a code coverage tool to contain instructions for tracing executed code, and sending collected data to a network grabber at an indicated network address or port. A code coverage tool enables tests to be run on an instrumented software application. A network grabber receives, at a network address or port, code coverage data from one or more application tests.

20 Claims, 12 Drawing Sheets

(56) References Cited

U.S. PATENT DOCUMENTS

| | | | |
|---|---|---|---|
| 9,251,028 B2* | 2/2016 | Barr | G06F 11/3409 |
| 2005/0160405 A1 | 7/2005 | Lunia | |
| 2007/0234309 A1 | 10/2007 | Davia | |
| 2008/0172580 A1 | 7/2008 | Davia | |
| 2009/0287729 A1* | 11/2009 | Chen | G06F 11/3676 |
| 2009/0326907 A1* | 12/2009 | Gulwani | G06F 8/49 |
| | | | 703/22 |
| 2010/0218169 A1* | 8/2010 | Andersen | G06F 11/0793 |
| | | | 717/125 |
| 2011/0047532 A1* | 2/2011 | Wang | G06F 11/3676 |
| | | | 717/130 |
| 2012/0304010 A1* | 11/2012 | Opstad | G06F 11/3676 |
| | | | 714/34 |
| 2013/0074059 A1* | 3/2013 | Emani | G06F 8/452 |
| | | | 717/158 |
| 2013/0117730 A1* | 5/2013 | Wisniewski | G06F 11/3664 |
| | | | 717/125 |
| 2014/0040866 A1* | 2/2014 | Barr | G06F 11/3409 |
| | | | 717/127 |
| 2014/0096113 A1* | 4/2014 | Kuehlmann | G06F 11/3672 |
| | | | 717/126 |
| 2015/0033315 A1* | 1/2015 | Gadamsetty | H04L 63/0815 |
| | | | 726/8 |
| 2015/0082286 A1* | 3/2015 | Gittelman | G06F 11/3676 |
| | | | 717/130 |

OTHER PUBLICATIONS

NCOVER, Code Central is your hub for measurable quality, Jun. 17, 2013, 8 pages. Retrieved from: http://www.ncover.com/products/code_central_tour#top.

NCOVER, Code Central is your hub for measurable quality, Jun. 17, 2013, 3 pages. Retrieved from: http://www.ncover.com/products/code_central_system_requirements#top.

NCOVER, Code Central is your hub for measurable quality, Jun. 17, 2013, 8 pages. Retrieved from: http://www.ncover.com/products/code_central_features#top.

NCOVER, Code Central is your hub for measurable quality, Jun. 17, 2013, 5 pages. Retrieved from: http://www.ncover.com/products/code_central.

* cited by examiner

SYSTEM AND METHOD FOR DETERMINATION OF CODE COVERAGE FOR SOFTWARE APPLICATIONS IN A NETWORK ENVIRONMENT

CLAIM OF PRIORITY

This application is a 371 of International Patent Application No. PCT/RU2014/000225, titled SYSTEM AND METHOD FOR DETERMINATION OF CODE COVERAGE FOR SOFTWARE APPLICATIONS IN A NETWORK ENVIRONMENT", filed on Mar. 28, 2014, which application is herein incorporated by reference.

FIELD OF INVENTION

Embodiments of the invention are generally related to software application development and testing, and are particularly related to a system and method for determination of code coverage for software applications in a network environment.

BACKGROUND

In the context of software application development, to help ensure their software application will perform as expected when delivered, a software developer can use a software test tool and test suites to estimate the level or quality of testing of their application.

Code coverage is a useful measure of describing the degree to which portions of the source code of a software application have been tested by a particular test suite. A variety of metrics, for example the extent to which a software application's subroutines, functions, or statements are called during execution of the test suite, can be used to calculate code coverage.

Generally, a software application with relatively higher code coverage may be considered more thoroughly tested than an application with relatively lower code coverage, and as such would be expected to have a lower likelihood of undiscovered software bugs. These are the general types of environment in which embodiments of the invention can be used.

SUMMARY

Described herein is a system and method for determination of code coverage for software applications in a network environment. In accordance with an embodiment, a software application can be instrumented by a code coverage tool to contain instructions for tracing executed code, and sending collected data to a network grabber at an indicated network address or port. A code coverage tool enables tests to be run on a software application. A network grabber receives, at a network address or port, code coverage data from one or more application tests.

DETAILED DESCRIPTION

Figure 1:
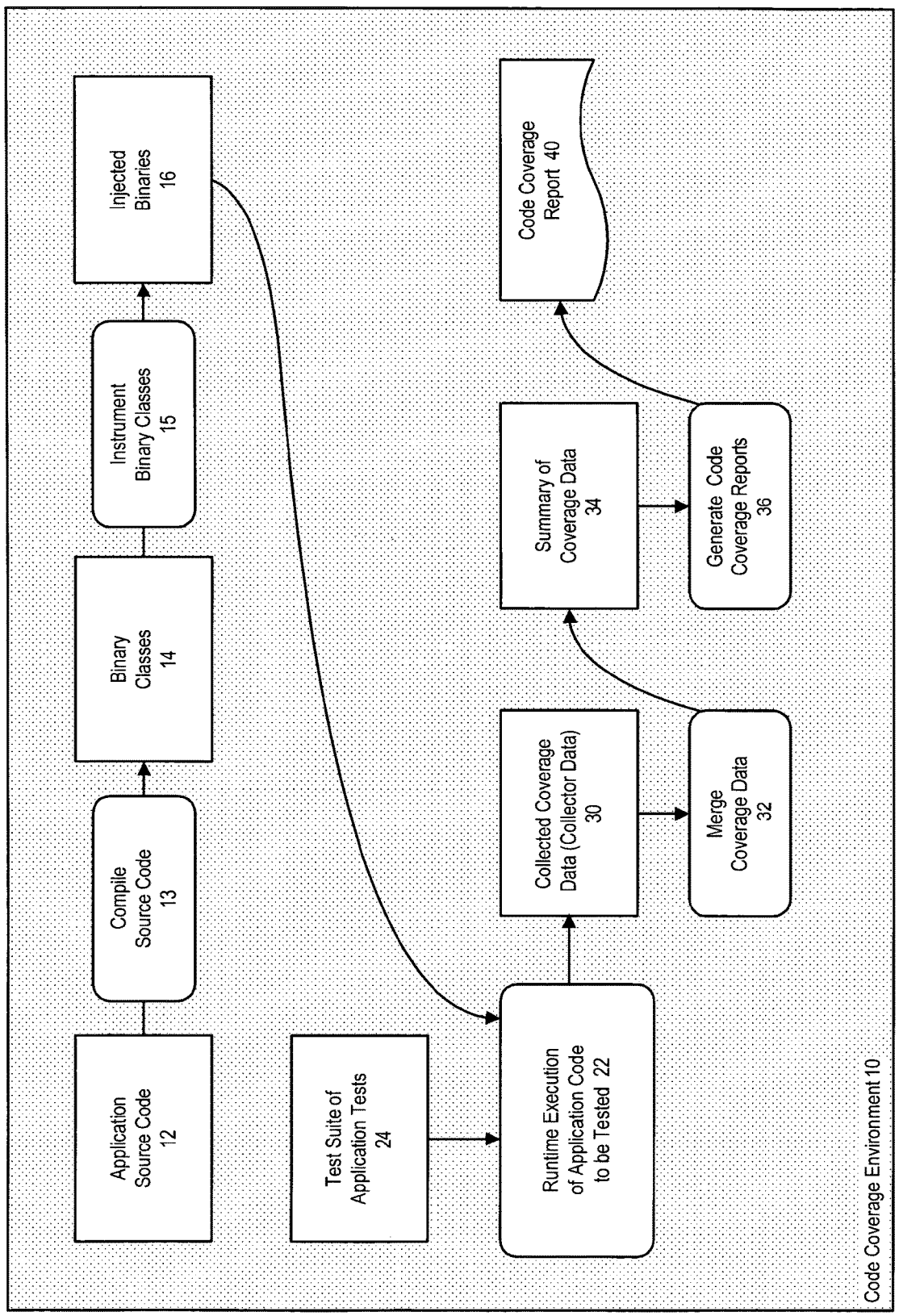
FIG. 1 illustrates the determination of software application code coverage, in accordance with an embodiment.

As described above, in the context of software application development, to help ensure their software application will perform as expected when delivered, a software developer can use a software test tool which includes a determination of code coverage, to estimate the level or quality of testing of their application.

Generally, a software application with relatively higher code coverage may be considered more thoroughly tested than an application with relatively lower code coverage, and as such would be expected to have a lower likelihood of undiscovered software bugs.

A typical code coverage tool operates by injecting or otherwise inserting extra software instructions into a software application code, in a process referred to as instrumentation. Subsequently, during the running of one or more application tests, the process of executing the instrumented code, including the inserted extra instructions, is an indicator of the code coverage tool or test having visited that section of code.

In some instances, the inserted extra instructions can also be used to automatically notify a collector component, within the code coverage tool or elsewhere, that the section of code has been visited.

For example, in accordance with an embodiment, each software application method, linear block, or other code construct can be associated with a unique identifier (ID), which the inserted extra instructions can pass to a collector. The collector can collect the data describing those IDs which were visited during a test, and incorporate the accumulated data into a code coverage report.

The general manner in which code coverage is determined, can be illustrated using the example shown in Listing 1, wherein a section of software application code is shown before instrumentation with extra instructions.

Listing 1

```
/* Software application before modification */
class Software application {
methodX( ) {
print("X"); }
methodY(int y) {
if (y > 0) {
print(y);
}
}
}
```

Listing 2 illustrates the same section of code, following instrumentation with the inserted extra instructions.

Listing 2

```
/* Software application after modification */
class Software application {
methodX( ) {
CoverageCollector.visited(1001);
print("X"); }
methodY(int y) {
CoverageCollector.visited(1002);
if (y > 0) {
CoverageCollector.visited(1004);
print("positive"); }
CoverageCollector.visited(1004);
print(y); }}
/* Extra code coverage code */
class CoverageCollector {
long[100000] data;
visited(int slot) {
data[slot] = true; }
save( ) {
saveToFile(data, "result.dat");
}
}
```

In the example shown in Listing 2, the inserted extra instructions invoke the visited( ) function of a CoverageCollector class with a unique ID of a software application construct, to increase the counter of visiting the construct.

The example described above is provided by way of illustration. In accordance with various embodiments, different types of inserted classes, functions, or other instructions can be used, in addition to or other than those illustrated above.

The manner in which the code coverage data that is collected during an application test, is ultimately converted into a human-readable code coverage report, may vary with different test tools.

For example, some code coverage tools may persist or save their collected code coverage data to a computer file after each test has completed. The persistently-stored computer file can then be read or otherwise used to prepare a human-readable report, for use by the software developer, a quality assurance specialist, or other user.

In accordance with an embodiment, the code coverage data generated by a code coverage tool and application test need not be saved directly to a computer file in such a manner, but instead can be communicated to a network grabber.

As described in further detail below, in accordance with various embodiments, the network grabber can execute on the same computer as that executing the software application, or alternatively can execute on a different computer, for example at a remote computer or host, and can receive code coverage data via a network, cloud, or other communication medium.

For example, in accordance with an embodiment, the network grabber can receive, at a network address or port, code coverage data from one or more application tests. The network grabber can then perform the subsequent tasks of processing the code coverage data and preparing the code coverage report.

In accordance with an embodiment, the process of instrumenting a software application, and using a network grabber to receive and process the code coverage data, can be generally summarized as follows:

Instrument the Software Application:

In accordance with an embodiment, within the software application code, a unique ID can be assigned to each software method or linear block. For example, an extra instruction such as Collect.visited(id), can be inserted in each method and linear block. Software class information, for example, information describing a CoverageCollector class, can also be added to a template associated with the software application (e.g., as a template.xml file). This allows the system to subsequently associate a particular ID within a code coverage data with the corresponding method or linear block in the software application code.

In accordance with various embodiments, a software application can be instrumented in different ways. For example, with source code instrumentation, extra instructions can be added to the application's source code prior to compilation. With binary instrumentation, an already compiled application binary code can be modified by injecting extra instructions into the binary files. Binary instrumentation is useful when the binary format is well specified, such as Java byte code. Source code instrumentation requires rebuilding of the application.

In accordance with an embodiment, instrumentation modifies the software application for purposes of tracing only, and does not alter the application's original functionality. The result of instrumentation includes one or more new/extra instructions within the application code, which are then used to call or utilize functions of the coverage tool.

Start the Network Grabber:

In accordance with an embodiment, a network grabber, which can be defined, for example, by a NetworkGrabber class, can be executed either on the same computer executing the software application, or at a remote computer or host. In accordance with an embodiment, the network grabber can listen at a particular network address or port for code coverage data to be received from application tests. The path to the software application's associated template (e.g., its template.xml file) can be provided to the network grabber, for its use in decoding particular IDs indicated within the code coverage data back to their corresponding methods or linear blocks.

Execute the Application Tests:

In accordance with an embodiment, during testing, one or more application tests are run against the instrumented software application, and a corresponding code coverage data is collected.

In accordance with an embodiment that supports the execution of Java software applications, the software application can be run within a Java virtual machine (JVM). When a particular JVM, which had been started by a test, subsequently exits, a save method (e.g., CoverageCollector.save( ) can be invoked, which then attempts to connect to the network grabber at its network address or port, and communicate its collected code coverage data.

In accordance with an embodiment, the host, network address and/or port information required to look up the network grabber can be provided, for example, by an environment variable (e.g., JCOV_HOST/JCOV_PORT), or by a property file (e.g., $HOME/.jcov.properties). In accordance with an embodiment, if the running of an application test starts multiple virtual machines or JVMs, then multiple save methods will be executed corresponding to the number of virtual machines or JVMs that were started. The network grabber handles incoming connections from collectors, and accumulates code coverage results from running the various tests.

Generate a Code Coverage Report:

In accordance with an embodiment, when the software application tests are completed, the network grabber can be stopped. In accordance with an embodiment, before exiting, the network grabber can generate a code coverage report, by filling out a template (e.g., the template.xml file associated with the software application) with the collected code coverage data.

The above steps are described in further detail below, in accordance with various embodiments. In accordance with other embodiments, different and/or additional components, features, and steps can be used.

Some of the advantages of using the network grabber approach for collection of code coverage data include that, in some instances, the sending of application test data over a network can be faster than directly persisting or saving the data to a file. For example, saving to a persistent file typically requires providing a means of synchronization to ensure monopoly access to the file, which can be readily implemented using a network grabber. Additionally, when tests are executed in parallel, the network grabber can assume the overhead of synchronization.

In accordance with various embodiments, the network grabber can provide transparency to software developers, quality assurance specialists, or other users executing tests, who need not be aware of the data-collecting process. Network grabbers also enable greater control over the process of data collection. For example, a network grabber can handle dynamic commands sent during test execution, or can be configured to implement smart collection in which code coverage data received from particular hosts or within a particular time period can be, for example, ignored or handled differently.

Introduction to Code Coverage

FIG. 1 illustrates the determination of software application code coverage, in accordance with an embodiment.

As shown in FIG. 1, in accordance with an embodiment, to calculate coverage of a software application in a code coverage environment 10, which includes an application source code 12, a software developer, quality assurance specialist, or other user can first compile 13 their application source code. In some instances, a particular application test may require a special type of compilation. Compilation of the software application results in a binary code or binary classes 14 of the software application, which can then be executed as a runtime instance.

The next step in the process is instrumentation 15 of the software application. For example, in accordance with an embodiment, injected code or extra instructions can be integrated into the original binary code of the software application, to create injected binaries 16. Generally, the injected code is required to calculate how many times a particular section of the application code was used at runtime.

Once instrumented in this manner, the injected binaries should functionally work the same way as the original (non-injected or non-instrumented) code. Although the injected or instrumented code may potentially affect the application's performance, it should not affect its functionality.

The software application can then be executed at runtime 22, and a code coverage tool with one or more test suites of application tests 24 can be run against the software application. In accordance with an embodiment, to gather more accurate coverage information 30, the software application and the application tests can be run in different test configurations, and/or can call alternative branches of code. As a result of the testing, one or more files are created with information about code coverage gathered in the various different modes.

In accordance with an embodiment, the gathered information can then be merged 32 into a summary data file 34, to calculate a summary code coverage. This step can be skipped if there is only one file or set of data with coverage information.

The last step in the process is to create 36 one or more human-readable code coverage reports 40. In accordance with an embodiment, a report generator can use as its input either the summary coverage data, or some particular coverage information obtained from running the tests.

Software Application Instrumentation

In accordance with an embodiment, a template (e.g., a template.xml file) can be generated to initialize the collection of code coverage data. The code coverage tool can create necessary template files with its execution counters initially set to zero, which takes into account the fact that some classes within a software application might not be used at all during testing, and therefore the resulting code coverage data files will not contain any information about such classes. Template generation allows the user to manually specify software application classes, so that their entries will be maintained within the template file, and information about the classes will not be lost when a template is combined with coverage results.

In accordance with various embodiments, different methods of instrumenting the software application can be used, which may include different uses of templates. For example, if a static instrumentation method is used, then a template can be generated at the end of the instrumentation process. If a dynamic instrumentation method is used, then the template must be prepared beforehand. The use of static and/or dynamic instrumentation modes is described in further detail below.

In accordance with an embodiment, the next step is to instrument the software application class files. After the application tests are run, each test execution will generate a code coverage data for executed parts of the software application. In accordance with an embodiment, a user can specify save points for the code coverage tool to save collected data after each invocation of specified methods.

As described in further detail below, if it is desired to save collected data over the network, then a network grabber can receive, for example at a socket associated with a network address or port, the code coverage data transmitted over the network, to create a snapshot of coverage data at a particular moment in time. Depending on the particular implementation, the code coverage tool can represent both a client and server side, in that it can be configured to retrieve, or to send, code coverage data upon request.

Figure 2:
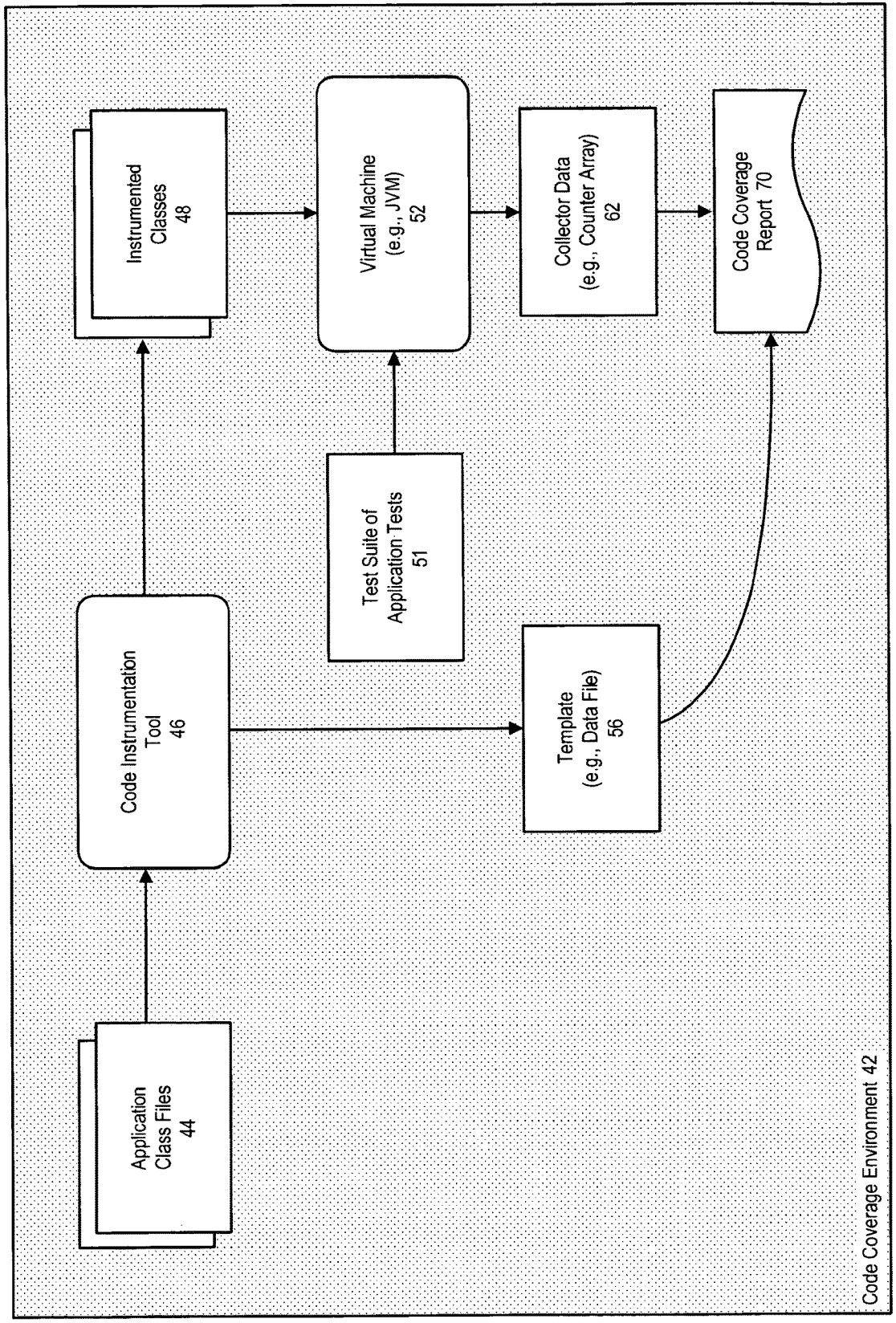
FIG. 2 further illustrates the determination of software application code coverage, in accordance with an embodiment.

FIG. 2 further illustrates the determination of software application code coverage, in accordance with an embodiment. As shown in FIG. 2, if the user uses static instrumentation, then the first step is to pass the compiled class files 44 through a code instrumentation tool 46, to create instrumented, ready-for-execution classes 48.

If dynamic instrumentation is used instead, then the software application can be executed immediately, but the user must attach a code coverage agent to the virtual machine or JVM 52 executing the application.

During static instrumentation, a template 56 can be generated automatically by the code instrumentation tool. If dynamic instrumentation is used, then the user must manually generate templates for use with the software application. In accordance with an embodiment, a template generator can be used to automatically generate a template file, using the compiled classes as input.

Following execution of the instrumented software applications with the test suite of application tests 51, the code coverage data can be generated 62, and used to create the code coverage report 70.

Instrumentation Techniques

As referred to above, in accordance with an embodiment, the code coverage tool can instrument software applications using a variety of different methods of instrumentation, for example using source code or binary instrumentation, and static or dynamic instrumentation.

For example, in order to gather information about how many times a particular coverage item of a class has been executed, the code coverage tool can insert additional Java instructions into the method code of a class. This process can be performed by an instrumentation tool. When an instrumented software application is executed, e.g., by a JVM, it can load several coverage tool runtime support classes.

In accordance with an embodiment, runtime support can be provided by a set of classes necessary to run an instrumented software application and collect data, and can include a collector component. The collector stores the code coverage data and manages execution counters or numbers that indicate how many times a method or block has been executed.

In accordance with an embodiment, each execution counter can be stored as an element of an array within the collector. The collector can write its arrays to a file or, in the case of a network grabber, communicate the arrays to a socket at an appropriate network address or port, when program execution completes and/or as various execution points specified in the software application code are reached.

Dynamic instrumentation is useful in those situations when the user does not have access to the software application source code, and allows the user to measure all loaded classes. For example, using dynamic instrumentation it is possible to test classes that are not represented as files.

In accordance with an embodiment, statically instrumented classes can be generated in a similar file format as the original file (e.g., as Java Archive (JAR), or Web Archive (WAR) files). As described above, instrumentation should not itself change the software application's functionality; however, each instrumented class reports information to a code coverage tool runtime support module. The runtime support module collects coverage information and saves it to a file or transmits it over the network as appropriate.

In accordance with an embodiment, a code instrumentation tool adds instrumentation to the class files for the software application that is being tested, before the application code is executed. During instrumentation, a template with a class structure is generated, which stores information about the class files in the software application. When the coverage results are saved and a data file is generated, this template is used to reconstruct class and method structures and attributes.

In accordance with an embodiment, code coverage data can be saved both in static and/or dynamic modes. In static mode, network grabbers can be used to communicate data over a network. The save process can be initiated by different events such as a Java platform process shutdown or a network request. In dynamic mode, the save process can be initiated, for example, by custom client code that sends a text command over TCP/IP to the network grabber.

The above instrumentation techniques are described by way of example, to illustrate some of the different techniques which can be used to instrument software applications. In accordance with various embodiments, other instrumentation techniques can be used.

Determination of Code Coverage

As described above, in accordance with an embodiment, the collected code coverage data need not be saved directly to a computer file, but is instead sent over a network, cloud, or other communication medium to a network grabber. The network grabber can then perform the subsequent tasks of preparing the code coverage report.

Figure 3:
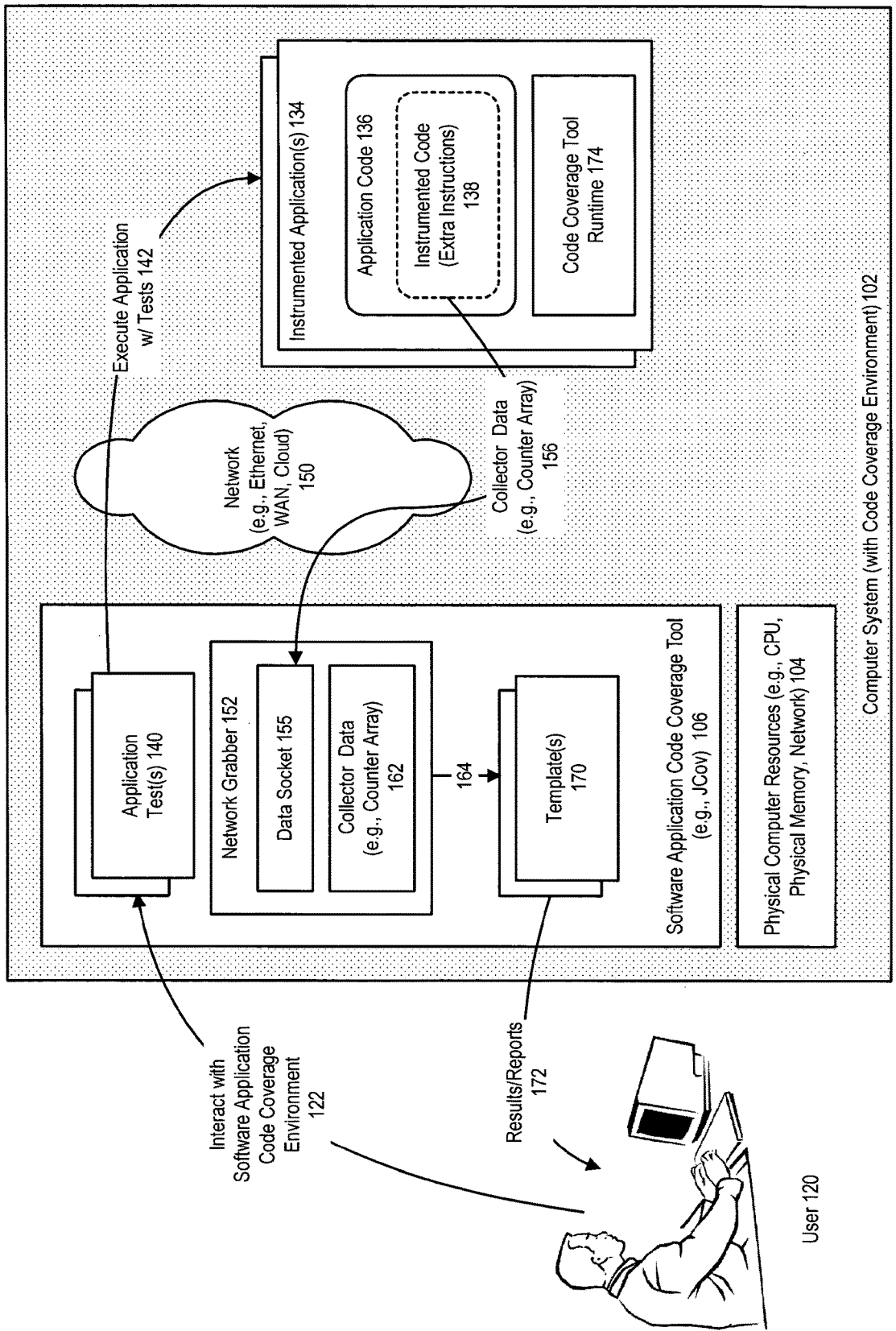
FIG. 3 illustrates a system for determination of software application code coverage, in accordance with an embodiment.

FIG. 3 illustrates a system for determination of software application code coverage, in accordance with an embodiment. As shown in FIG. 3, a code coverage environment can be provided at a computer system 102, which can include one or more physical computer resources 104, such as processors, memory, or network components, and a software application code coverage tool 106.

A user 120, such as a software developer, quality assurance specialist, or other user can interact 122 with the software application code coverage environment. As described above, the software application 134 includes a software application code 136, which can be instrumented 138 with extra instructions using any of the techniques described above.

The user can define one or more application tests 140 to be run 142 against a software application which has been previously instrumented by a code coverage tool.

In accordance with an embodiment, a network grabber 152 can be started with a template data file obtained during the instrumentation phase.

In accordance with an embodiment, the network grabber can be provided on the same computer, or alternatively can communicate over a network 150. In accordance with an embodiment, the system which includes the network grabber can provide a data socket 155, at which network address or port the network grabber can receive the results of tests as the tests are run. Code coverage data is provided as collector data 156 to the network grabber, for example as a counter array, which then uses the data 162, in combination 164 with one or more templates 170, to generate code coverage results or reports 172.

Different types of collector data can be used. For example, in accordance with an embodiment, a boolean[ ] data can be used to represent coverage data, including an array indexed by unique IDs, wherein the data[i] is true if the i-th element is covered (i.e., visited), and is false if not.

In accordance with an embodiment, a code coverage tool runtime support 174 can be provided by a set of classes necessary to run the instrumented software application and collect the code coverage data generated during execution of application tests.

In accordance with an embodiment, one or more network grabbers can be configured as receivers of code coverage tool data transmitted over the network. In this configuration, the network grabbers act as utilities that take a snapshot of coverage data at a particular moment in time, and store it in a tool data file or other medium, for subsequent use.

In accordance with an embodiment, the user can use network grabbers to save coverage data to a file when it might not otherwise be possible, for example due to security restrictions. Depending on the options that a software application has been instrumented with, the software application can send data to the network grabber through, for example, TCP/IP protocols using Java platform sockets.

In accordance with an embodiment that supports Java ME, the Java ME runtime support works as a client, and sends its code coverage data when the JVM shuts down or when save points are reached. A network grabber receives coverage data from the runtime over the network.

In accordance with an embodiment, the host name and port number of the network grabber is passed to the runtime at start-up so that it knows where to send data. A user can use the network grabber's -port option to synchronize with the runtime. The data includes the host name and port number on which the network grabber was started.

In accordance with an embodiment that supports Java Card, the Java Card runtime differs from the Java ME runtime described above in that it does not allow the test process to finish until the network request from the network grabber is detected and coverage data is transmitted. The user can start the network grabber in client mode (using the -once option) at the moment it is clear that test execution is finished. With both the Java ME and JavaCard platform runtimes, the network options (host and port) must be in sync when passed to the runtime and network grabber.

The Java ME and Java Card examples of tool runtimes are described above to illustrate how a network grabber can be configured for use in different code coverage environments. In accordance with other embodiments, other environments and configurations can be supported.

In accordance with an embodiment, code coverage agents usually save their collected data when the process executing the software application (e.g., the Java process or JVM) shuts down. In accordance with an embodiment, the user may also specify particular save points (for example, beginnings and endings of methods) whose invocation causes the code coverage tool to save results. Additional options allow a code coverage agent to listen for network requests to save data. Save points can be specified by the user through -savebegin and -saveatend options.

In accordance with an embodiment, a user can use a -port option to turn network listening on. In accordance with an embodiment, the save process depends on the existence of an output file and a -merge option value. If the -merge option value is used, then collected data is merged with the template and written to a new unique file with a generated numeric suffix. If the output file exists and the -merge value is not directed to overwrite data, then collected data is merged with the existing output file and stored in this file. Otherwise, the collected data is merged with the template and saved to the output file.

In accordance with an embodiment, a merger component is provided as a utility (Merger) that merges several tool data files that have been obtained from multiple runs of the profiled software application. The merger utility enables the user to merge the data and estimate the overall coverage percentage. The report generator creates a code coverage report for one or more classes of the software application.

Collection of Code Coverage Data

Figure 4:
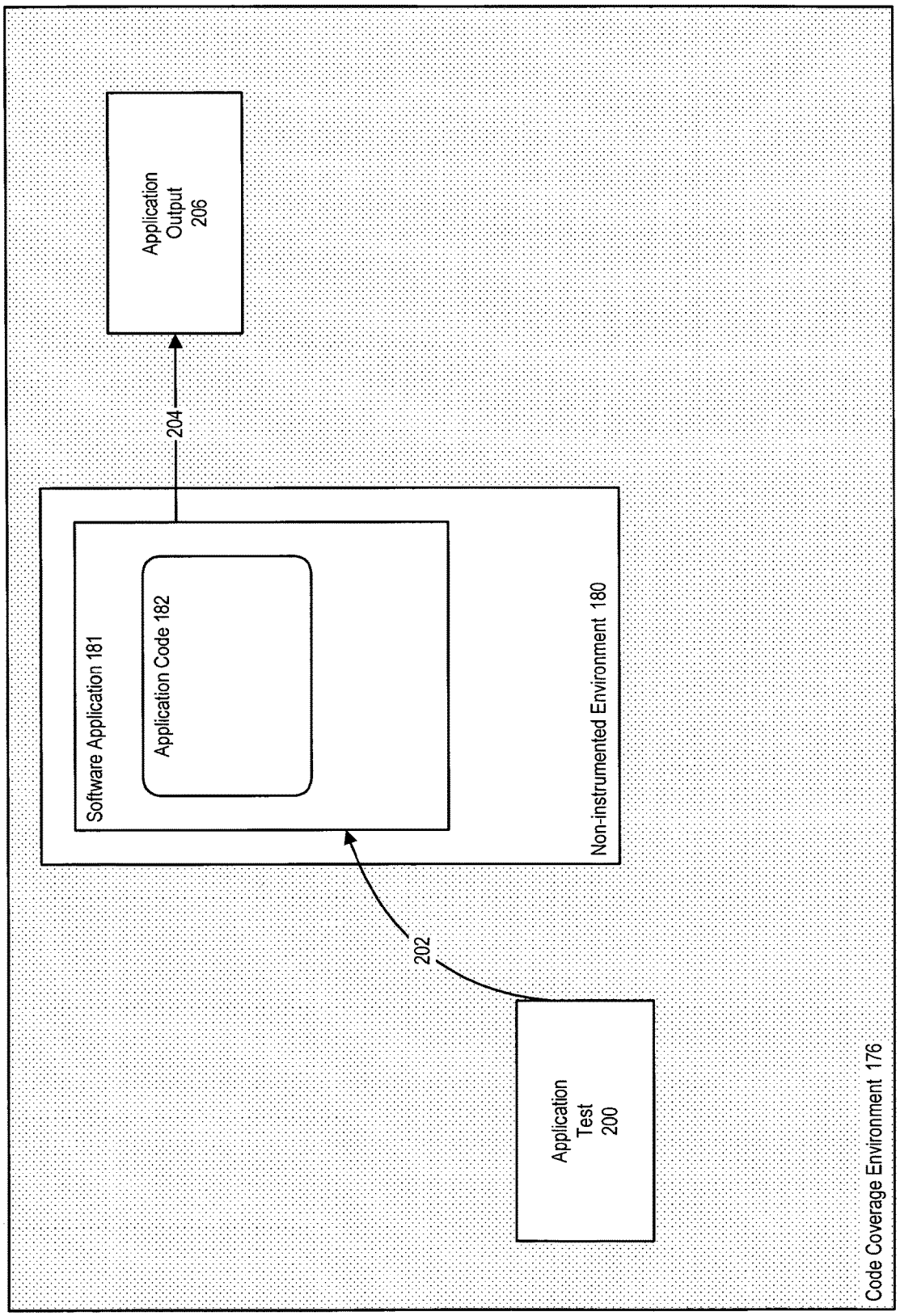
FIG. 4 illustrates how the system can be used for determination of software application code coverage, in accordance with an embodiment.

FIG. 4 illustrates how the system can be used for determination of software application code coverage, in accordance with an embodiment. As shown in FIG. 4, a regular (non-instrumented) environment 180 may include a software application 181, including an application code 182. One or application tests 200 can be run 202 against the application, which causes the application to generate 204 an application output 206.

Figure 5:
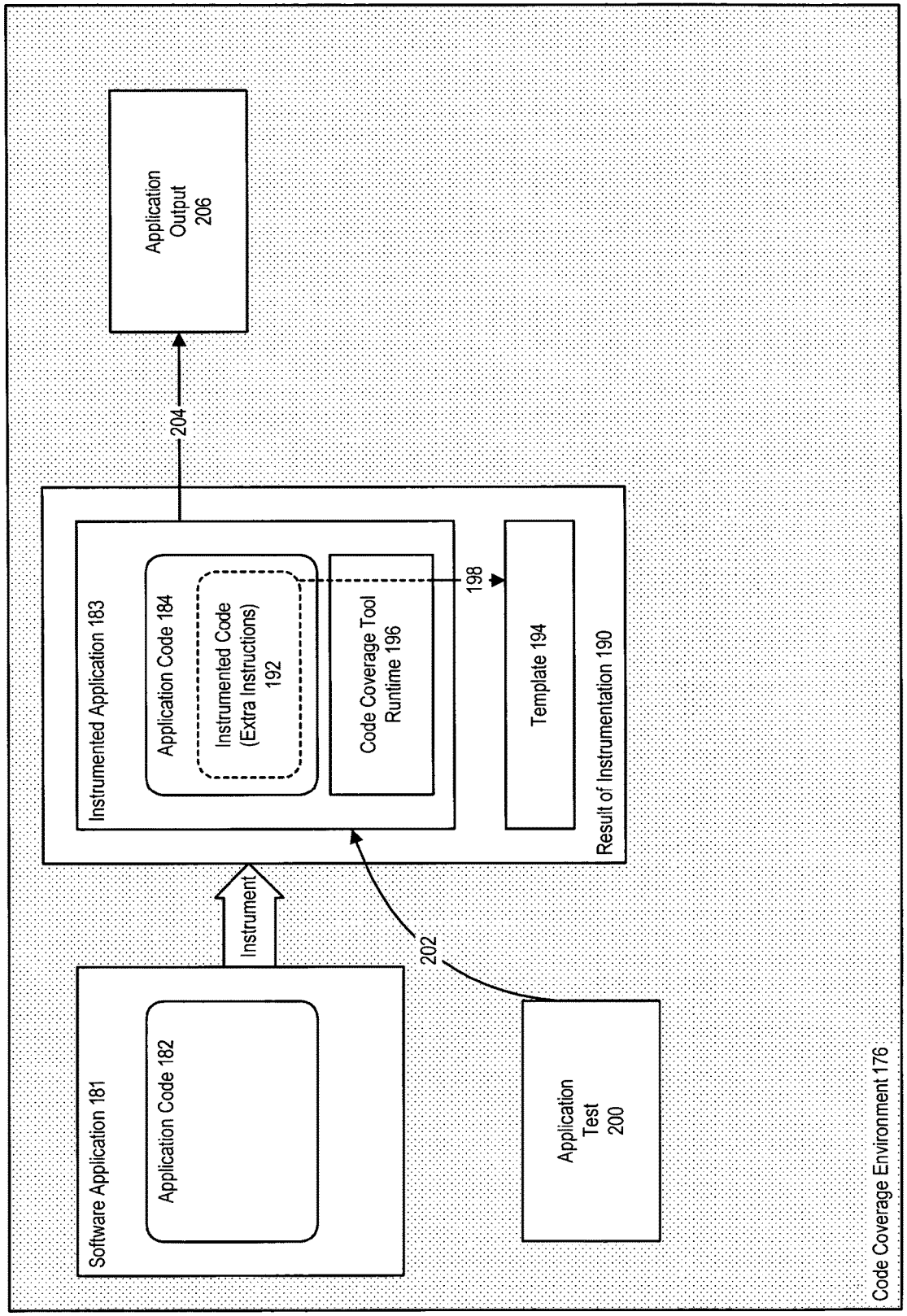
FIG. 5 further illustrates how the system can be used for determination of software application code coverage, in accordance with an embodiment.

FIG. 5 further illustrates how the system can be used for determination of software application code coverage, in accordance with an embodiment. As shown in FIG. 5, in accordance with an embodiment, the software application code can be instrumented using one or more of the techniques described above, to create an instrumented software application 183, in which the instrumented software application code 184 includes one or more instrumented code or extra instructions 192.

In accordance with an embodiment, the result of instrumentation 190 also includes a template 194 describing the classes within the software application. The code coverage tool can also provide the runtime support 196 necessary to run the instrumented software application, and to collect 198 the code coverage data.

A user, such as a software developer or quality assurance specialist, can run one or more application tests against the software application, as before. Since instrumentation modifies the software application for purposes of tracing only, and does not alter the application's original functionality, the software application should generate an application output as usual.

Figure 6:
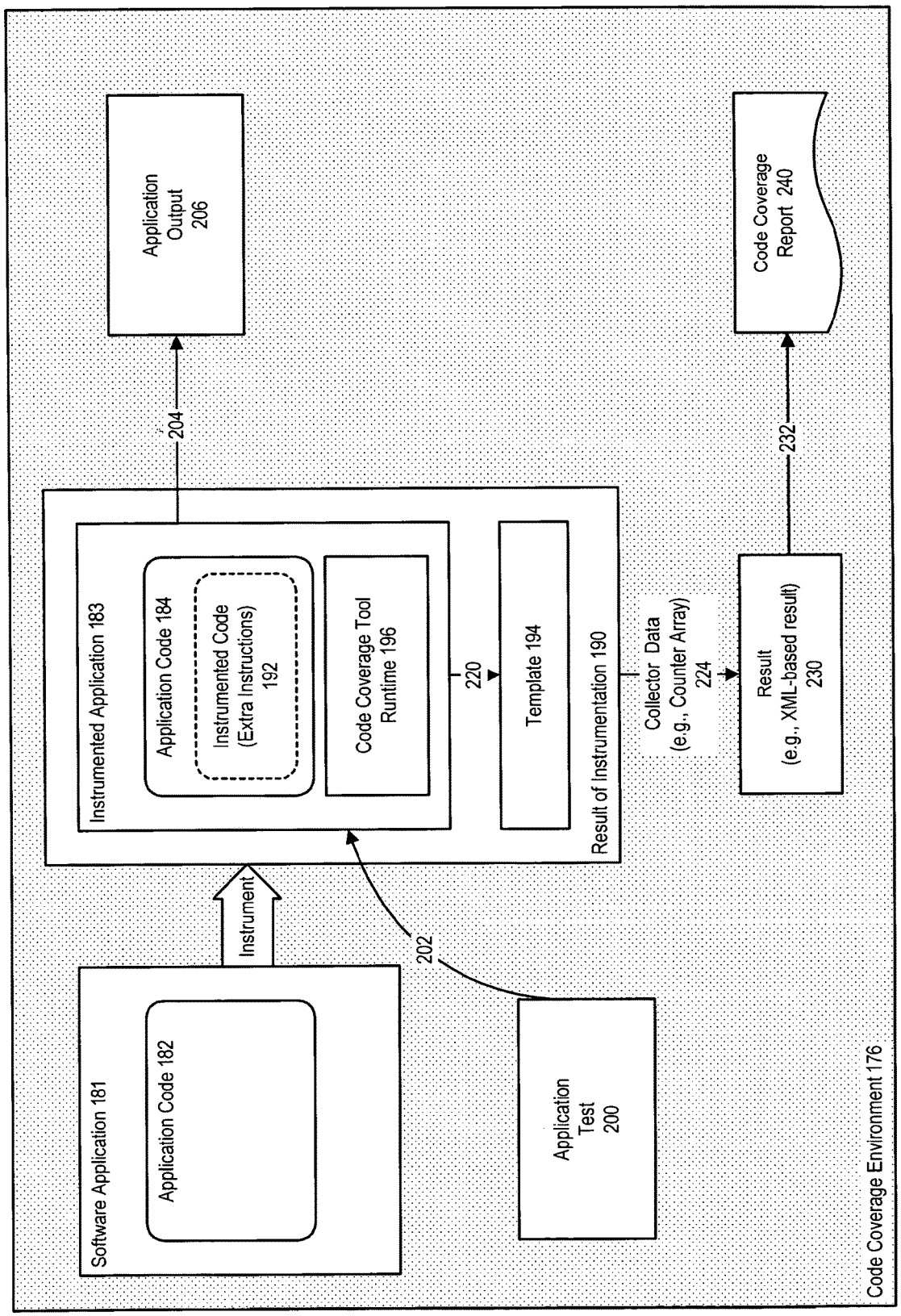
FIG. 6 further illustrates how the system can be used for determination of software application code coverage, in accordance with an embodiment.

FIG. 6 further illustrates how the system can be used for determination of software application code coverage, in accordance with an embodiment. As shown in FIG. 6, additional code coverage data, and template information can be provided 220, to the code coverage tool runtime, which prepares collector data 224 as a result, for example, by completing an XML template 230 associated with the software application being tested. The information can then be used to prepare 232 a human-readable code coverage report 240.

Figure 7:
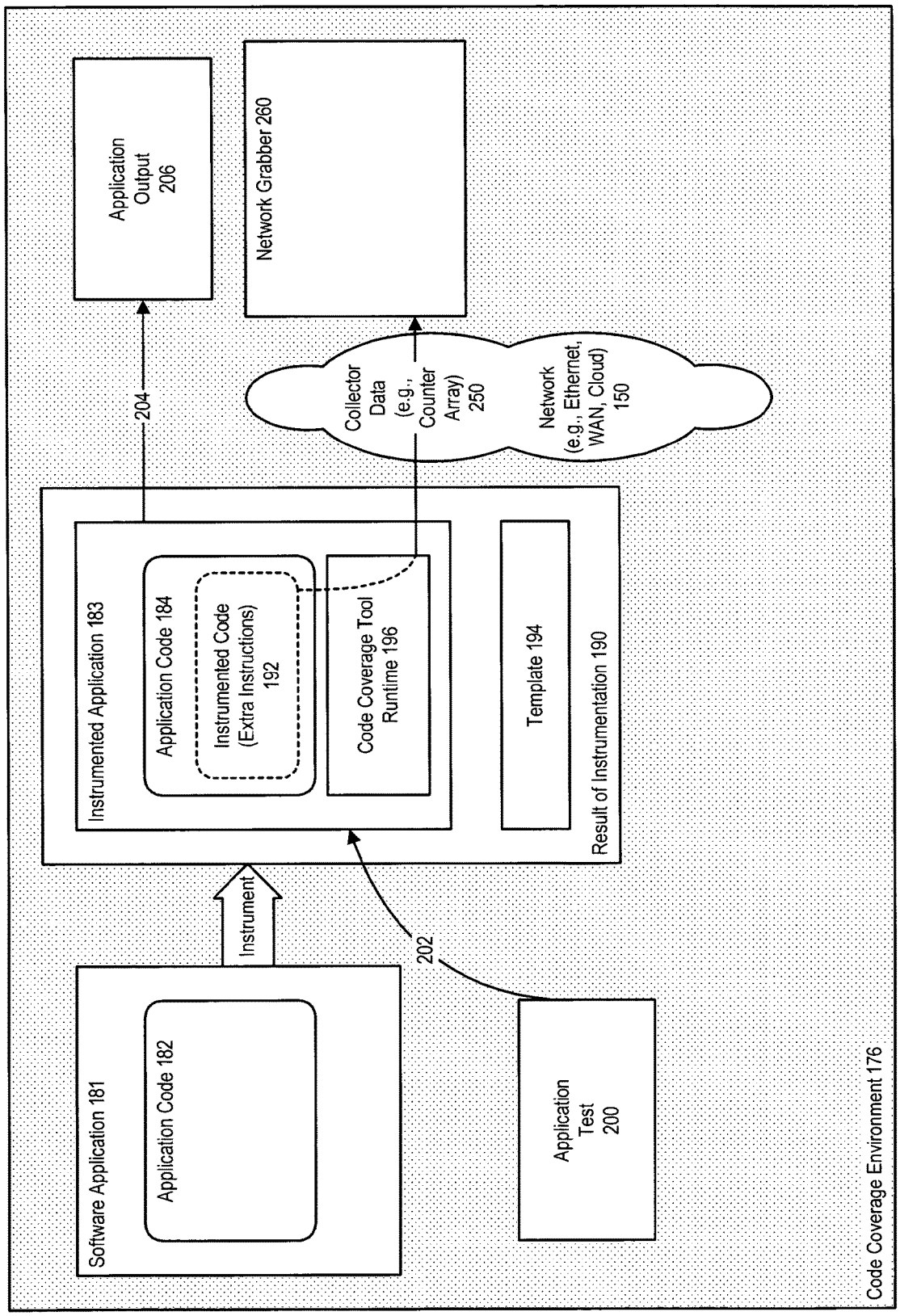
FIG. 7 further illustrates how the system can be used for determination of software application code coverage, in accordance with an embodiment.

FIG. 7 further illustrates how the system can be used for determination of software application code coverage, in accordance with an embodiment. As shown in FIG. 7, the software application code can be instrumented using one or more of the techniques described above, to create an instrumented software application code which includes one or more extra instructions. Again, the user can run one or more application tests against the software application, and since its functionality has not changed, the software application should generate an output as usual.

As further shown in FIG. 7, in accordance with an embodiment, the instrumented software application code includes a collector that collects a counter array and communicates it 250 to a network grabber 260. The result of instrumentation similarly includes a template describing the classes and other software constructs within the software application. The user can then run one or more application tests against the software application.

Figure 8:
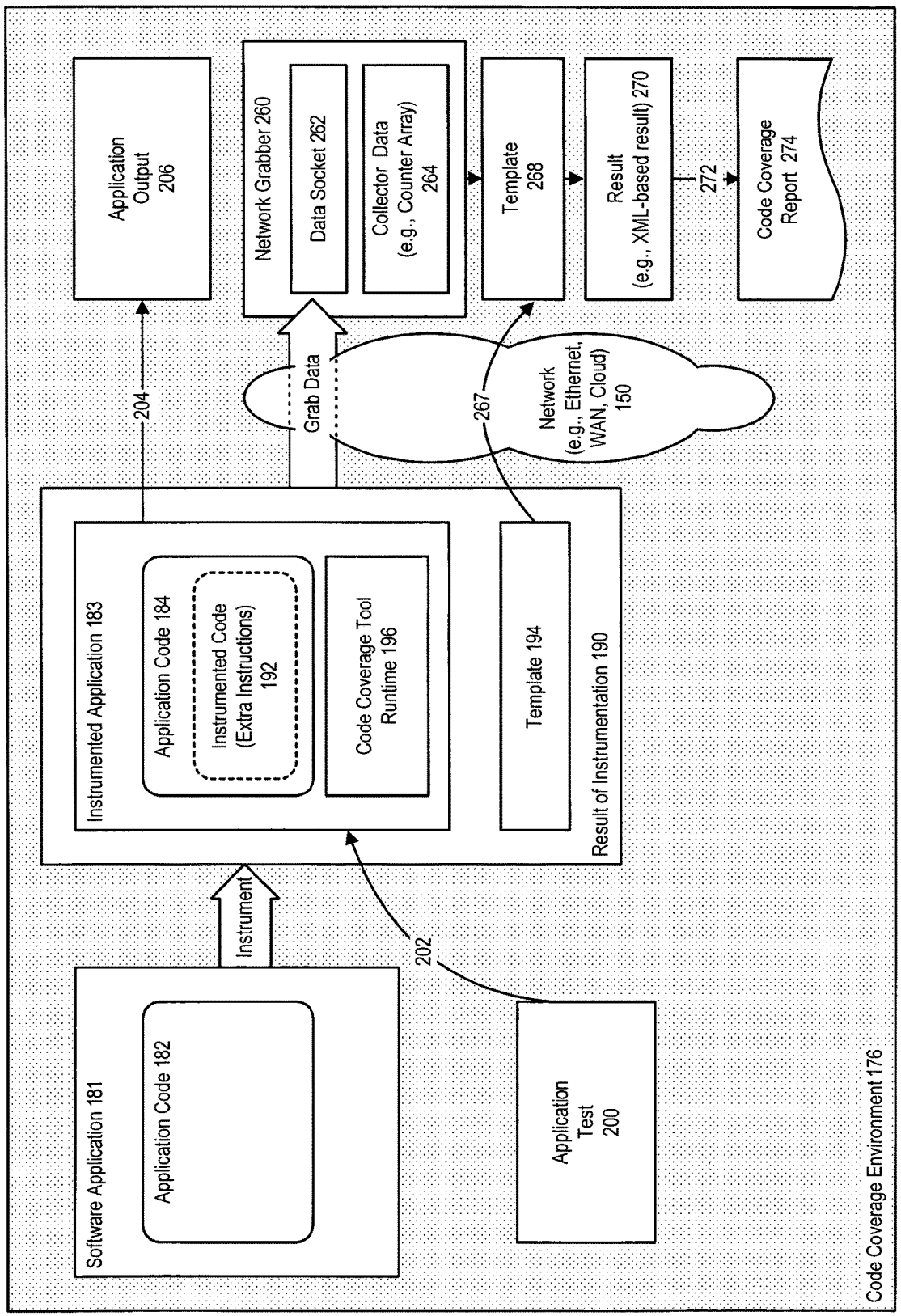
FIG. 8 further illustrates how the system can be used for determination of software application code coverage, in accordance with an embodiment.

FIG. 8 further illustrates how the system can be used for determination of software application code coverage, in accordance with an embodiment. As shown in FIG. 8, in accordance with an embodiment, the results of the application tests can be provided to a network grabber at a socket 262 associated with a host, network address, or port. The code coverage data 264 can then be used with templates 268 (for example, as received 267 or otherwise associate with the instrumented application), to calculate code coverage results 270, and ultimately to prepare 272 a code coverage report 274.

Code Coverage with Multiple Functions and Applications

Figure 9:
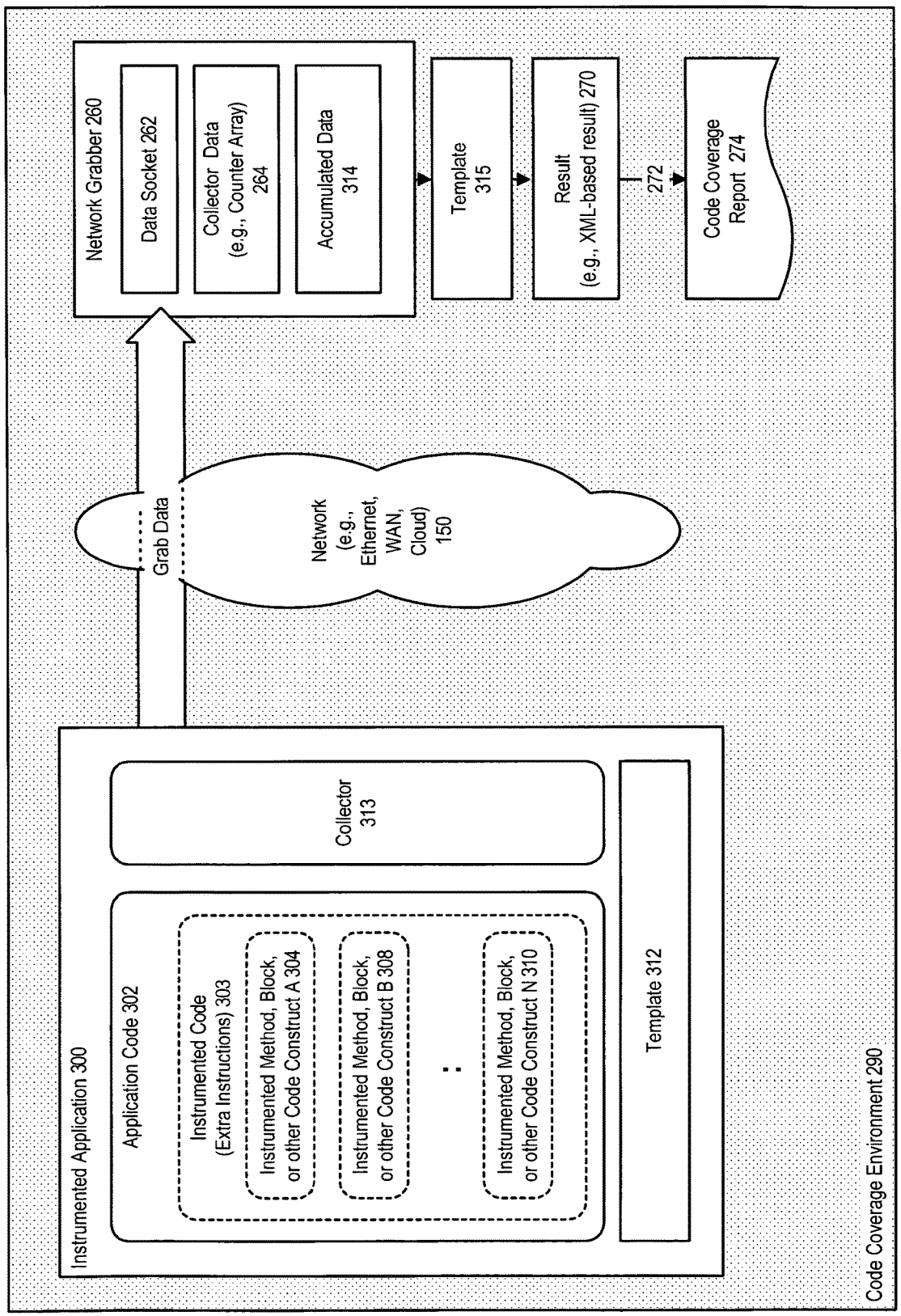
FIG. 9 further illustrates how the system can be used for determination of software application code coverage, including testing of multiple software methods, blocks, or other code constructs in accordance with an embodiment.

FIG. 9 illustrates how the system can be used for determination of software application code coverage, including testing of multiple software methods, blocks, or other code constructs, in accordance with an embodiment. As shown in the code coverage environment 290 of FIG. 9, in accordance with an embodiment, the code coverage data can be communicated to a network grabber via a network or cloud. An instrumented software application 300 includes an application code 302, which can include multiple instrumented sections 303 (shown as A 304, B 308, C 310), each of which is associated with a template 312, 315, and a collector 313, which provides collected or accumulated data 314 to the network grabber, for use in creating a code coverage report.

Figure 10:
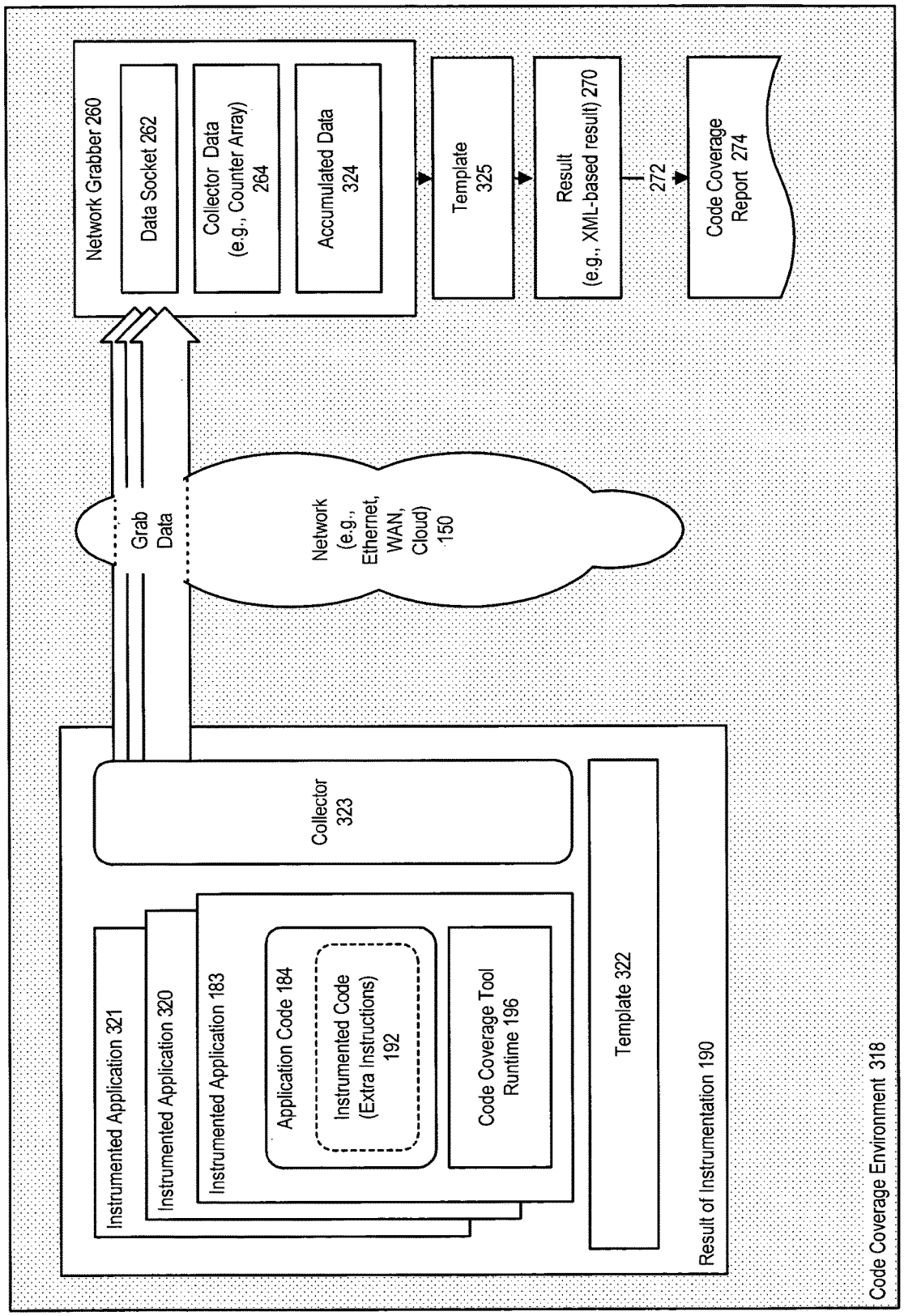
FIG. 10 further illustrates how the system can be used for determination of software application code coverage, including testing of multiple applications in parallel, in accordance with an embodiment.

FIG. 10 further illustrates how the system can be used for determination of software application code coverage, including testing of multiple applications in parallel, in accordance with an embodiment. As shown in the code coverage environment 318 of FIG. 10, in accordance with an embodiment, the network grabber can receive test results from a plurality of software applications being tested, including a first instrumented software application (183) generally as described as above, and one or more other software applications 320, 321, each including instrumented software application code, wherein each of the software applications are associated with a template 322, 325, and a collector 323.

In accordance with an embodiment, as each software application exits, the collector can provide the collected test results to the network grabber where the code coverage data can be accumulated 324, for use in creating a code coverage report.

Figure 11:
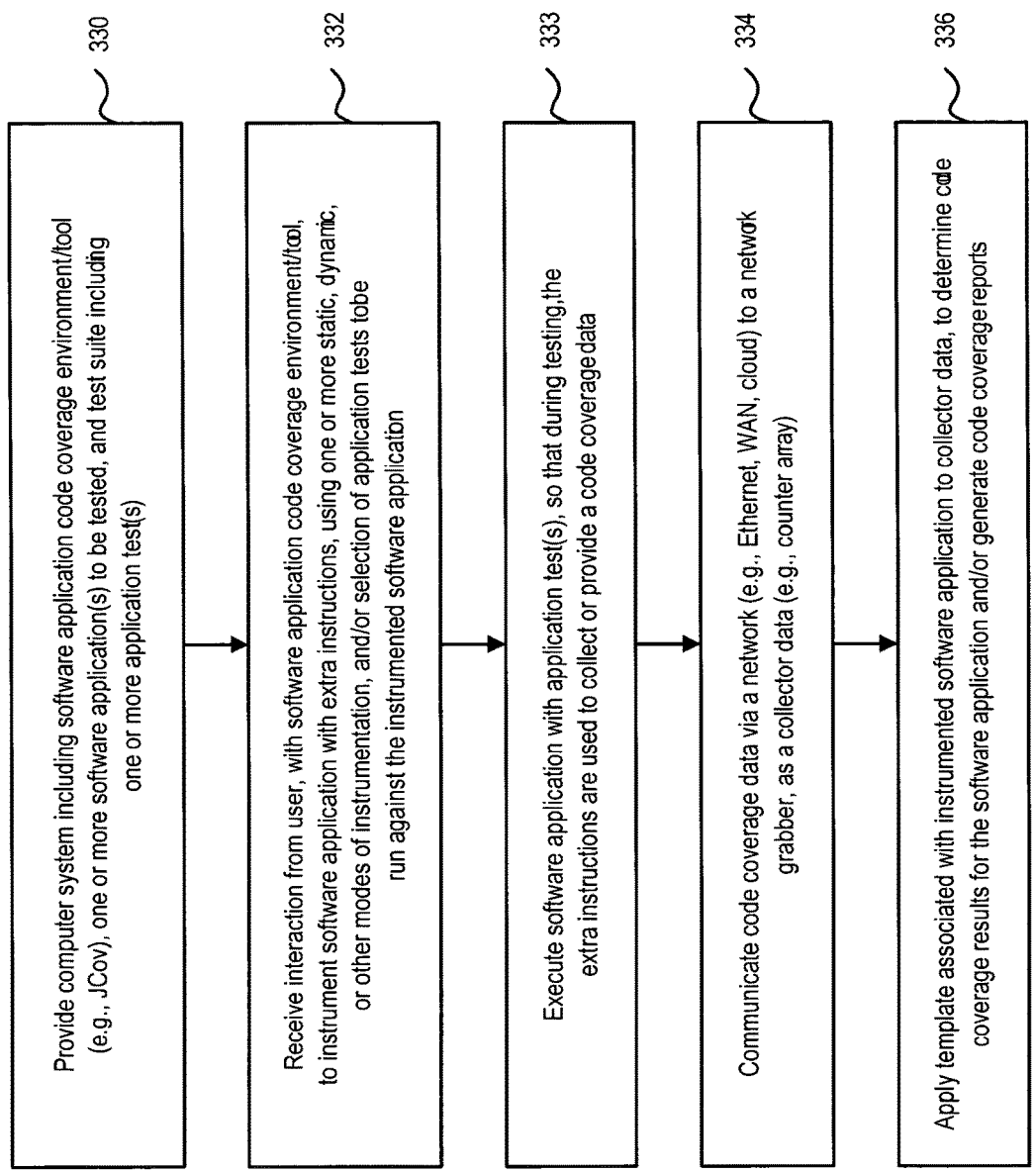
FIG. 11 illustrates a method of determining software application code coverage, in accordance with an embodiment.

FIG. 11 illustrates a method of determining software application code coverage, in accordance with an embodiment. As shown in FIG. 11, at step 330, a computer system including a software application code coverage environment/tool (e.g., JCov) is provided, together with one or more software applications to be tested, and a test suite including one or more application tests.

At step 332, an interaction is received from a user, with the software application code coverage environment/tool, to instrument a software application with extra instructions, using one or more static, dynamic, or other modes of instrumentation, and/or selection of application tests to be run against the instrumented software application.

At step 333, the software application is executed with the one or more application tests, so that during testing, the extra instructions are used to collect or provide a code coverage data.

At step 334, following completion of the application tests, code coverage data is communicated via a network (e.g., cloud) to a network grabber, as a collector data (e.g., a counter array).

At step 336, a template associated with the instrumented software application is applied to the collector data, to determine code coverage results for the software application and/or generate code coverage reports.

Example Code Coverage Tool Implementation

In accordance with an embodiment, an example implementation of a code coverage tool (referred to herein in some instances as "JCov") is described below, including use of the code coverage tool with a network grabber to instrument and test software applications.

The command line options and features described below are provided by way of illustration of a particular embodiment. In accordance with other embodiments and implementations, other types of command line options and features can be supported.

In accordance with an embodiment, the code coverage tool works with compiled classes that can be packed in JARs or Zips, and is generally based on byte code instrumentation, in which the tool determines which sections of code have been visited during execution of one or more tests, and injects its own instructions that register the fact of visiting those sections. When a software application exits, the collected result is provided to an XML file which can be subsequently translated into human-readable html report.

Since the software application is instrumented, the application becomes dependent on the tool's runtime classes, which should be available during execution and testing. The runtime classes are responsible for accumulating coverage data and storing the data to a result file or making them available for the network grabber.

In accordance with an embodiment, a result file (e.g., a result.xml file) contains detailed report on visited methods/blocks/branches and is good for machine processing, but not suitable for people. A report generator (RepGen) utility can be provided to produce human-readable report. Instrumentation can be controlled using an Instr command:

java -jar jcov.jar Instr app.jar

During the instrumentation process, software application classes are modified suing any of the techniques described above. For example, at the beginning of each method, linear block or branch, the code coverage tool can insert instructions equivalent to, e.g., Collect.hit(12345), or an invocation of a static method hit(int slot) of the tool runtime Collect class, with a unique value. The template.xml file, created during instrumentation, can be used to decode a unique slot number back to the corresponding methods, blocks, or branches.

Listing 3 illustrates an example of code instrumented in this manner.

Listing 3

```
public void methodDo(boolean flag) {
Collect.hit(10001);
if (flag) {
Collect.hit(10002);
System.out.println("flag is set"); }
Collect.hit(10003);
System.out.println("Finish");
}
```

Listing 4 illustrates an example of how the Collect.hit(int slot) method described above can be implemented.

Listing 4

```
public class Collect {
private static long counts[ ] = new long[1000000];
public static void hit(int slot) {
counts[slot]++; }
}
```

In accordance with an embodiment, the overhead of running the instrumented classes is not particularly burdensome to the software application. For example, information on visited code can be readily stored as an array of longs, while the application's template.xml file can also be readily filled with the collected data.

In accordance with an embodiment, the Collect class also includes a save( ) method, which initializes dumping of coverage data. The save( ) method should be invoked by the software application, otherwise no result will be available. In accordance with an embodiment, the save( ) method can be invoked on JVM exit, using for example a shutdown hook. In accordance with an embodiment, the code coverage tool allows the user to specify other moments at when to call save( ) by using -saveBegin/saveAtEnd options together with the lnstr command.

In accordance with an embodiment, the runtime time component of the code coverage tool is responsible for accumulating data and saving results. Runtime classes will be executed on the tested platform. The tool can support several implementations of runtime classes, which can be packed in separate JAR files, for example: jcov_file_saver.jar which dumps a result directly to result.xml file; jcov_network_saver.jar which sends collected data to a remote network grabber over a network (a Java SE API can be used); jcov_me_network_saver.jar which sends collected data to a remove network grabber over network (Java ME API can be used); and jcov_jcard_saver.jar which is a saver applicable for be used with Java card environments.

After instrumentation, the classes of a software application become dependent on the code coverage tool runtime, so they need to be in the classpath when the software application is started.

Depending on the contents of the saver.jar put on the classpath, as described above, the different manner of data saving or communicating will be applied, as appropriate. In those situations in which modification of software application classpath is not trivial, and adding jcov_xxx_saver.jar is difficult, an alternative approach is to implant jcov_saver classes into the software application JAR. In accordance with an embodiment, the jcov_file_saver.jar and jcov_network_saver.jar provide embedded code on injection of their content into the software application:

java-jar jcov_file_saver.jar app.jar

In accordance with an embodiment, if the system is being used to collect coverage on an exotic platform, or due to some reasons existing savers are not suitable, then a custom saver can be used.

In accordance with an embodiment, the network grabber can be provided as a code coverage tool component that starts as a separate process and listens for the data to be sent from an instrumented software application. A typical command to start the network grabber:

java-jar jcov.jar grabber

In accordance with an embodiment, the network grabber listens to a specified port, accumulates the received data and creates summary report. To control the network grabber, a network grabber management utility (GrabberManager) can also be used, which allows stopping of a running network grabber, or to get its current state:

java-jar jcov.jar grabberManager stop

The use of the network grabber allows reduction in overhead on using the code coverage tool while running tests, since some actions will be done in a separate process or even on a separate host.

In accordance with an embodiment, a report generator utility (RepGen) can be used to turn XML form the original software application's template data, into a human-readable format (such as readable HTML or text). The report generator utility can also be responsible for counting overall statistic as well as statistic by package or by class, and line coverage. If a path to software application sources is given, then the report generator will generate detailed report for each classes, where block/branch coverage info is bound to the source line.

In accordance with an embodiment, a variety of report generator options allows the user to reduce the amount of output information, for example to narrow the list of packages and classes, not restrict the number of methods, or include into the report only necessary columns or even apply custom transformations:

java-jar jcov.jar repgen result.xml

In accordance with an embodiment, the code coverage tool can be executed via a JVM TI interface:

java-javaagent:jcov.jar-jar myApp.jar

In accordance with this embodiment, the general principle is the same, but classes are instrumented during class loading, without running the lnstr command separately. As the result of issuing the above command, all of the classes loaded by the JVM will be instrumented and included into the report. The user can then use include/exclude options to filter out from the report those classes which are not desired to be included in the report:

java-javaagent:jcov.jar=i=com.my.myApp.*-jar myApp.jar

Example Code Coverage Scenarios

Described below are several typical scenarios of obtaining software application code coverage information with the code coverage tool, to demonstrate various aspects of using the tool. Depending on the developer or user's expertise they can apply their own modifications to the described scenarios, to better address their particular needs.

If one considers a Java software application (set of JAR files) located in a folder myApp/, a software developer may have provided a set of tests for their software application, which is run by the command runTests.sh, and it is desired to know the level of code coverage is provided by the tests. The typical scenario begins with instrumentation of the software application:

java-java jcov.jar productInstr-rt jcov_network_saver.jar-t template.xml myApp

In accordance with an embodiment, a user, for example the software developer, a quality assurance specialist, or other user, can start a network grabber, in a separate console, or even on a separate machine perform the command, wherein myApp-template.xml is the path to the template; and myApp-result.xml is a path to a file that will be created:

java-jar jcov.jar grabber-t myApp-template.xml-o myApp-result.xml

The user can then run tests as regularly. If the network grabber was started on a remote host, then the user would need to set, e.g., an environment variable JCOV_HOST, to indicate the name of the remote machine or its network address or port prior test execution, and then stop the network grabber:

java-jar jcov.jar grabberManager-kill

Once the grabber has been stopped, the user can generate a report:

Java-jar jcov.jar repgen-o myApp-report/myApp-result.xml

In a variation of the above, a single command can be used:

Java-jar jcov.jar jcov-product myApp/-command "./runTests.sh"

The above command will do all the steps as described above, but within a single JVM. Coverage of individual tests provides possibility to distinguish coverage provided by individual tests, for example to detect which particular tests hit a method.

Typically, to obtain information on individual test coverage, a separate code coverage report must be determined for each test and the multiple reports merged together.

To include in the summary report all software application classes, and not only those invoked by tests, the user needs to generate a template for their product:

java-jar jcov.jar tmplGen-t myApp-template.xml app.jar

In this example, the tmplGen command works similarly to the Instr command described above, but does not produce instrumented classes, just a template. Code coverage reports can then be merged if appropriate:

```
find . -name t*.xml > xml.lst
java -jar jcov.jar merger -t myApp-template.xml
-scale -filelist xml.lst -o summary.xml
```

Wherein xml.lst indicates the file where individual reports are listed; and the -scale and -flag options tell the merger utility to remember test hitting the methods; and the summary.xml indicates the resulting file with information on individual test coverage. The tool can then be used to generate a report:

java-jar jcov.jar repgen-o myApp-report/-scale summary.xml

When starting the network grabber, the simplest way to start network grabber is:

java-jar jcov.jar grabber-template template.xml

In accordance with an embodiment, the network grabber requires a template to be provided, even for dynamic mode. The user can obtain the template by running the TmplGen command (Java-jar jcov.jar TmplGen-h).

In accordance with an embodiment, the network grabber allocates two ports, the first for receiving data from tests (3334 by default), and the second (3336) for controlling commands. The user can change default values by specifying -port and -command_port options. The wait command initializing may take a period of time; if the network grabber and tests are started by the same script, the tests should wait until the network grabber is ready, which can be accomplished by running the wait command:

```
java -jar jcov.jar grabber <options> &
java -jar jcov.jar grabbermanager -wait
<run-tests>
```

This command will wait for a period until the network grabber will start accepting connections. The network grabber by default merges received data in memory. To merge with scales information the -outTestList<file> option should be given to Network grabber.

java-jar jcov.jar grabber-template t.xml-outTestList tests.lst

In accordance with an embodiment, test names can be taken from a "jcov.file" system property, or a JCOV_FILE environment variable when tests are executed. If the network grabber is used in static mode, jcov_implant.jar can be used as the runtime library to collect data in static mode, which will automatically save data to the network grabber:

```
java -jar jcov.jar instr -output myapp_instred/ myapp.jar
java -cp myapp_instred/myapp.jar:jcov_implant.jar myapp.MainClass
```

The user can also implant a runtime library to the JAR:

```
java -jar jcov.jar instr -t app-templ.xml -output myapp_instred/
-implantrt jcov_implant.jar myapp.jar
java -jar jcov.jar grabber -t app-templ.xml -o app-res.xml
-outTestList app-test.lst &
java -jar jcov.jar grabberManager wait
java -Djcov.file = test1-jar myapp_instred/myapp.jar arg1
```

```
java -Djcov.file = test2 -jar myapp_instred/myapp.jar arg2
java -jar jcov.jar grabberManager kill
```

Implanting runtime libraries allows the system to run instrumented JARs without classpath changing. When using the network grabber and dynamic mode, nothing special should be done to make the network grabber collect dynamic coverage, other than adding a network grabber option to the code coverage agent parameter string:

Java-javaagent:jcov.jar=grabber=,file=test2-jar myapp.jar

The user can also specify the network grabber's port and host:

```
java -javaagent: 'jcov.jar=grabber,file=test3,port=2222,host=remote.host'
-jar myapp.jar
```

In accordance with an embodiment, it is possible to run the network grabber and tests on different machines. To instruct the code coverage tool where to send data, the user can set a host property:

```
grabberhost.us.oracle.com# java -jar jcov.jar grabber <options>
testhost.us.oracle.com# java -javaagent:jcov.jar=grabber=,
file=test3,host=grabberhost.us.oracle.com -jar myapp.jar
```

The user can also set tool properties through Java properties and environment variables:

```
testhost.us.oracle.com# java -Djcov.host=grabberhost.us.oracle.com
-javaagent:jcov.jar=grabber=,file=test4 -jar myapp.jar
testhost.us.oracle.com# export
JCOV_HOST=grabberhost.us.oracle.comtesthost.us.oracle.com# java
-javaagent:jcov.jar=grabber=,file=test4 -jar myapp.jar
```

In accordance with an embodiment, the use of the "kill" command will wait until the network grabber will stop, and will then write to a result file. In accordance with an embodiment, a testlist file will be also written if an outTestList option was set on network grabber startup. The GrabberManager utility also supports a host parameter in case the network grabber is started on a different machine.

After stopping the network grabber, the user can receive a result.xml file, which can be used for generating report. The filename can be changed through a network grabber output option (Java-jar jcov.jar grabber-output merged.xml-outTestList merged.lst).

Cloud-Based Determination of Code Coverage

Figure 12:
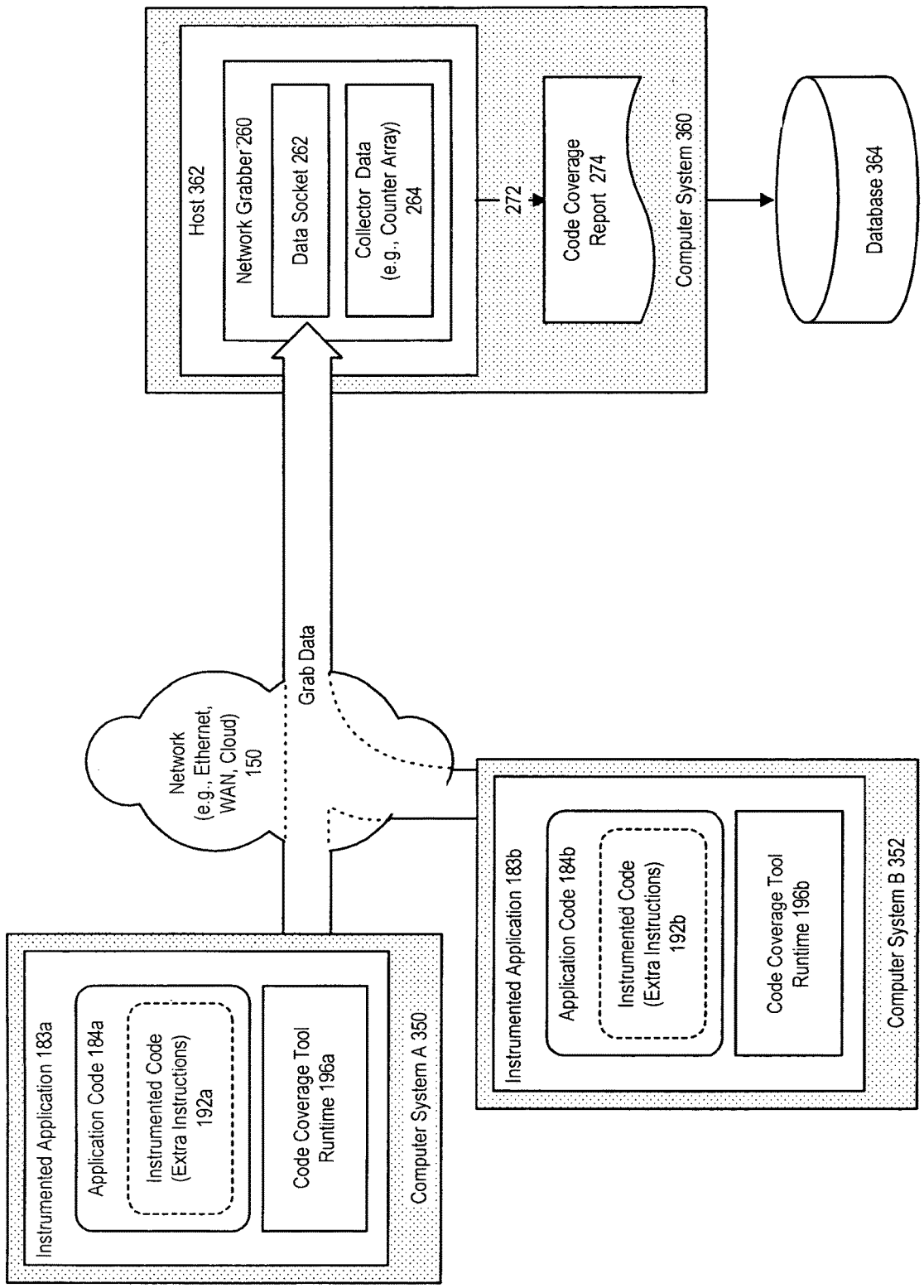
FIG. 12 illustrates the determination of software application code coverage in a cloud or similar environment, in accordance with an embodiment.

FIG. 12 illustrates the determination of software application code coverage in a cloud or similar environment, in accordance with an embodiment.

As shown in FIG. 12, in accordance with an embodiment, the system can support the use of software application test and code coverage communication via a network or cloud, including a plurality of computer systems 350, 352 acting as clients, and one or more computer systems 360 acting as a host 362.

For example, each of the clients can operate within a cloud-based environment, and use a host-based service to test software applications at the clients.

In accordance with an embodiment, each of the clients can include one or more software applications, instrumented using the variety of techniques as described above. The system can be used to run application tests at each of the clients. Code coverage information can be provided to the host, using a network grabber as described above, where it can be saved within a database 364 for future code coverage use.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. For example, although the examples provided above illustrate use of a code coverage tool with a Java environment, other embodiments can support other software languages or versions thereof.

The embodiments were chosen and described in order to best explain the principles of the invention and its practical software application, thereby enabling others skilled in the art to understand the invention for various embodiments and with various modifications that are suited to the particular use contemplated. It is intended that the scope of the invention be defined by the following claims and their equivalence.

What is claimed is:

1. A system for determination of code coverage for software applications in a network environment, comprising: one or more processors;
   a coverage tool runtime support class executing on the one or more processors;
   a software application code coverage tool, executing on the one or more processors, which operates to insert a function call at a plurality of locations in a class of an instrumented software application, wherein the function call invokes a function of the coverage tool runtime support class, and wherein each instance of the function call passes, as a parameter of the function call, a unique identifier (UID) to the function of the coverage tool runtime support class;
   a collector component of the coverage tool runtime support class that stores a plurality of execution counters as elements of an array, and wherein each UID is associated with a respective one of the plurality of execution counters and communicates the array to a network address or port at intervals specified in the instrumented software application;
   wherein, for each UID received by the function of the coverage tool runtime support class as a result of execution of the function call, the function of the coverage tool runtime support class generates collector data respectively associated with each received UID;
   a template file associated with the instrumented software application, wherein the template file specifies the class of the instrumented software application;
   a network grabber, executing on the one or more processors, that operates to
   receive, over a network, at the network address or port and from the coverage tool runtime support class, the collector data, including the plurality of execution counters stored as elements of the array,
   receive a path to the template file,
   merge the collector data including the value of the plurality of execution counters respectively associated with each UID, with the template file; and
   output a code coverage report from the merged template file, wherein the code coverage report reports code coverage for the instrumented software application.

2. The system of claim 1, wherein the template file associated with the instrumented software application is an XML file configured to be filled out by the received code coverage data during the merging of the template and the received collector data.

3. The system of claim 1, wherein the array is a boolean array, wherein the elements of the array are indexed by the unique identifiers respectively associated with each execution counter stored as an element of the array, and wherein the data[i] is true if the i-th element is covered, and the data[i] is false if the i-th element is not covered.

4. The system of claim 1, wherein the network grabber is associated with the network address or port.

5. The system of claim 4, wherein the network grabber receives the code coverage data from the code coverage tool via TCP/IP protocols.

6. The system of claim 5, wherein the network is provided as part of a cloud environment.

7. The system of claim 6, wherein the network grabber receives collector data from a plurality of clients within the cloud environment, each of which clients operate one or more software application code coverage tools to determine code coverage data for software applications at those clients.

8. A method for determination of code coverage for software applications in a network environment, comprising:
   providing a coverage tool runtime support class that execute on one or more processors;
   providing a software application code coverage tool, that executes on the one or more processors, wherein, when executing on the one or more processors the software application code coverage tool performs the step of inserting a function call at a plurality of locations in a class of an instrumented software application, wherein the function call invokes a function of the coverage tool runtime support class, and wherein each instance of the function call passes, as a parameter of the function call, a unique identifier (UID) to the function of the tool runtime support class;
   providing a collector component of the coverage tool runtime support class that stores a plurality of execution counters as elements of an array, and wherein each UID is associated with a respective one of the plurality of execution counters and communicates the array to a network address or port at intervals specified in the instrumented software application;

generating collector data, by the function of the coverage tool runtime support class and for each different UID received by the function of the coverage tool runtime support class as a result of execution of the function call;

generating a template file associated with the instrumented software application, wherein the template file specifies the class of the instrumented software application;

receiving, over a network, from the coverage tool runtime support class at the network address or port and by a network grabber, executing on the one or more processors, the collector data, including the plurality of execution counters stored as elements of the array;

receiving, by the network grabber, a path to the template file;

merging, by the network grabber, the collector data including the value of the plurality of execution counters respectively associated with each DID, with the template file; and outputting, by the network grabber, a code coverage report from the merged template file, wherein the code coverage report reports code coverage for the instrumented software application.

9. The method of claim 8, wherein the template file associated with the instrumented software application is an XML file configured to be filled out by the received code coverage data during the merging of the template and the received collector data.

10. The method of claim 8, wherein the array is a Boolean array, wherein the elements of the array are indexed by the unique identifiers respectively associated with each execution counter stored as an element of the array, and wherein the data[i] is true if the i-th element is covered, and the data[i] is false if the i-th element is not covered.

11. The method of claim 8, wherein the network grabber is associated with the network address or port.

12. The method of claim 11, wherein the network grabber receives the code coverage data from the code coverage tool via TCP/IP protocols.

13. The method of claim 12, wherein the network is provided as part of a cloud environment.

14. The method of claim 13, wherein the network grabber receives collector data from a plurality of clients within the cloud environment, each of which clients operate one or more software application code coverage tools to determine code coverage data for software applications at those clients.

15. A non-transitory computer readable storage medium including instructions stored thereon which when read and executed by one or more computers cause the computers to perform the steps comprising:

providing a coverage tool runtime support class that execute on one or more processors;

providing a software application code coverage tool, that executes on the one or more processors, wherein, when executing on the one or more processors the software application code coverage tool performs the step of inserting a function call at a plurality of locations in a class of an instrumented software application, wherein the function call invokes a function of the coverage tool runtime support class, and wherein each instance of the function call passes, as a parameter of the function call, a unique identifier (UID) to the function of the coverage tool runtime support class;

providing a collector component of the coverage tool runtime support class that stores a plurality of execution counters as elements of an array, and wherein each UID is associated with a respective one of the plurality of execution counters and communicates the array to a network address or port at intervals specified in the instrumented software application;

generating collector data, by the function of the coverage tool runtime support class and for each different UID received by the function of the coverage tool runtime support class as a result of execution of the function call;

generating a template file associated with the instrumented software application, wherein the template file specifies the class of the instrumented software application;

receiving, over a network, from the coverage tool runtime support class at the network address or port and by a network grabber, executing on the one or more processors, the collector data, including the plurality of execution counters stored as elements of the array;

receiving, by the network grabber, a path to the template file;

merging, by the network grabber, the collector data including the value of the plurality of execution counters respectively associated with each UID, with the template file; and outputting, by the network grabber, a code coverage report from the merged template file, wherein the code coverage report reports code coverage for the instrumented software application.

16. The non-transitory computer readable storage medium of claim 15, wherein the template file associated with the instrumented software application is an XML file configured to be filled out by the received code coverage data during the merging of the template and the received collector data.

17. The non-transitory computer readable storage medium of claim 15, wherein the array is a boolean array, wherein the elements of the array are indexed by the unique identifiers respectively associated with each execution counter stored as an element of the array, and wherein the data[i] is true if the i-th element is covered, and the data[i] is false if the i-th element is not covered.

18. The non-transitory computer readable storage medium of claim 15, wherein the network grabber is associated with the network address or port.

19. The non-transitory computer readable storage medium of claim 18, wherein the network grabber receives the code coverage data from the code coverage tool via TCP/IP protocols.

20. The non-transitory computer readable storage medium of claim 19, wherein the network is provided as part of a cloud environment, and wherein the network grabber receives collector data from a plurality of clients within the cloud environment, each of which clients operate one or more software application code coverage tools to determine code coverage data for software applications at those clients.

* * * * *

UNITED STATES PATENT AND TRADEMARK OFFICE
CERTIFICATE OF CORRECTION

PATENT NO. : 10,725,893 B2
APPLICATION NO. : 14/418812
DATED : July 28, 2020
INVENTOR(S) : Fazunenko et al.

Page 1 of 1

It is certified that error appears in the above-identified patent and that said Letters Patent is hereby corrected as shown below:

In the Specification

In Column 4, Line 41, delete "NetworkGrabber" and insert -- Network Grabber --, therefor.

In Column 9, Line 26, delete "JavaCard" and insert -- Java Card --, therefor.

In Column 13, Line 3, delete "save( )" and insert -- save( ), --, therefor.

In the Claims

In Column 19, Line 19, in Claim 8, delete "DID," and insert -- UID, --, therefor.

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*